US008532427B2

(12) United States Patent
Meyers et al.

(10) Patent No.: US 8,532,427 B2
(45) Date of Patent: Sep. 10, 2013

(54) SYSTEM AND METHOD FOR IMAGE ENHANCEMENT

(75) Inventors: Ronald Everett Meyers, Columbia, MD (US); Keith Scott Deacon, Coumbia, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 133 days.

(21) Appl. No.: 13/247,470

(22) Filed: Sep. 28, 2011

(65) Prior Publication Data

US 2013/0077888 A1    Mar. 28, 2013

(51) Int. Cl.
G06K 9/38    (2006.01)
G06K 9/40    (2006.01)

(52) U.S. Cl.
USPC .......................................... 382/274; 382/272

(58) Field of Classification Search
USPC ........................................................ 382/274
See application file for complete search history.

(56) References Cited

U.S. PATENT DOCUMENTS

| 5,933,540 | A  | * | 8/1999  | Lakshminarayanan et al. ............................ 382/260 |
| 6,707,943 | B2 | * | 3/2004  | Gicquel et al. ................. 382/199 |
| 7,061,528 | B1 | * | 6/2006  | Honma ....................... 348/222.1 |
| 7,536,012 | B1 |   | 5/2009  | Meyers et al. |
| 7,702,180 | B2 | * | 4/2010  | Lange et al. .................. 382/276 |
| 7,812,303 | B2 |   | 10/2010 | Meyers et al. |
| 7,847,234 | B2 |   | 12/2010 | Meyers et al. |
| 8,053,715 | B2 |   | 11/2011 | Meyers et al. |
| 8,126,267 | B2 | * | 2/2012  | Talati et al. ................... 382/172 |
| 8,144,107 | B2 | * | 3/2012  | Toffoli et al. ................. 345/102 |
| 8,242,428 | B2 |   | 8/2012  | Meyers et al. |
| 8,373,107 | B2 |   | 2/2013  | Meyers et al. |
| 2006/0221100 | A1 | * | 10/2006 | Kao et al. ...................... 345/690 |
| 2011/0293259 | A1 | * | 12/2011 | Doepke et al. ................ 396/236 |

OTHER PUBLICATIONS

Walton, S. R., et al. "Processing photometric full-disk solar images." Solar Physics 179.1 (1998): 31-42.*
R. Meyers, K. Deacon, and Y. Shih, 'Ghost-imaging experiment by measuring reflected photons,' Phys. Rev. A 77, 041801(R) (2008).
D. L. Donoho, "Compressed sensing," IEEE Transactions on Information Theory, vol. 52, pp. 1289-1306, 2006.
E. Candes, J. Romberg, and T. Tao, "Robust uncertainty principles: Exact signal Reconstruction from Highly Incomplete Frequency Information," IEEE Trans. Inf. Theory, 52, 489 (2006).
Giuliano Scarcelli, et al. "Can Two-Photon Correlation of Chaotic Light Be Considered as Correlation of Intensity Fluctuations?" Physics Review Letters 96, 063602 (2006).

(Continued)

*Primary Examiner* — Michelle Entezari
(74) *Attorney, Agent, or Firm* — Lawrence E. Anderson

(57) ABSTRACT

A method and system for forming an improved image from a series of frames comprising inputting a pixel value array for each image frame; summing the pixel values in each frame to obtain the frame intensity for each frame; multiplying the pixels in pixel value array by the frame intensity; summing the frame intensity multiplied pixel value arrays together and dividing by the number of frames to obtain an average of the frame intensity multiplied pixel value arrays; then, using the inputted pixel value arrays, creating an array of average pixel values; multiplying the array of average pixel values by the average frame intensity for all of the inputted frames; and subtracting the array of average pixel values multiplied by average frame intensity from the average of the frame intensity multiplied pixel value arrays to provide an array of modified pixel values to form an improved image.

20 Claims, 13 Drawing Sheets

(56) References Cited

OTHER PUBLICATIONS

O. Katz, Y. Bromberg, Y. Silberberg, "Compressive Ghost Imaging," Appl Phys. Lett., 95, 131110 (2009).

J. Shapiro, "Computational ghost imaging," Phys. Rev. A vol. 78 061802(R) (Dec. 18, 2008).

R. Meyers and K. Deacon, "Quantum Ghost Imaging Experiments At ARL", Proc. SPIE vol. 7815, 78150I, (2010).

M. Figueiredo, R. Nowak, and S. Wright, "Gradient projection for sparse reconstruction: Application to compressed sensing and other inverse problems (2007)," IEEE J. Sel. Topics on Signal Processing, 1, 586 (2007).

R. Meyers, K. Deacon, and Y. Shih, "A new Two-photon Ghost Imaging Experiment with Distortion Study," J. Mod. Opt., 54, 2381-2392 (2007).

R. Meyers, K. Deacon, and Y. Shih, "Quantum imaging of an obscured object by measurement of reflected photons," Proc. SPIE vol. 7092, 70920E (2008) doi:10.1117/12.797926.

R. Meyers, K. Deacon, and Y. Shih, "Turbulence-free ghost imaging," Appl. Phys. Lett. 98, 111115 (Mar. 18, 2011); doi:10.1063/1.3567931.

R. Glauber, "The Quantum Theory of Optical Coherence," Phys. Rev. 130, 2529 (1963) 131, 2766 (Jun. 1963).

T. B. Pittman, et al. "Optical imaging by means of two-photon quantum entanglement," Phys. Rev. A 52, R3429-R3432 (1995).

D. Strekalov, et al. "Observation of Two-Photon 'Ghost' Interference and Diffraction," Phys. Rev. Lett. 74, 3600-3603 (1995).

* cited by examiner

INPUT A SERIES OF FRAMES (e.g., 1-100) OF A GIVEN SCENE, SUCH AS FOR EXAMPLE, PHOTOGRAPHY THAT WAS INFLUENCED BY THE EFFECTS OF TURBULENCE OR THE LIKE

DETERMINE OVERALL INTENSITY (BUCKET VALUE - SUMMATION OF EACH PIXEL AT EACH PIXEL LOCATION) FOR EACH FRAME

DETERMINE THE AVERAGE OVERALL INTENSITY FOR ALL FRAMES IN THE SERIES OF FRAMES (SUM OF INTENSITIES DIVIDED BY NUMBER OF FRAMES)

SEPARATE THE FRAMES HAVING AN OVERALL INTENSITY *GREATER* THAN THE AVERAGE OVERALL INTENSITY (SET 1) FROM THE FRAMES HAVING AN OVERALL INTENSITY *LESS* THAN THE AVERAGE OVERALL INTENSITY (SET 2)

FIG.3

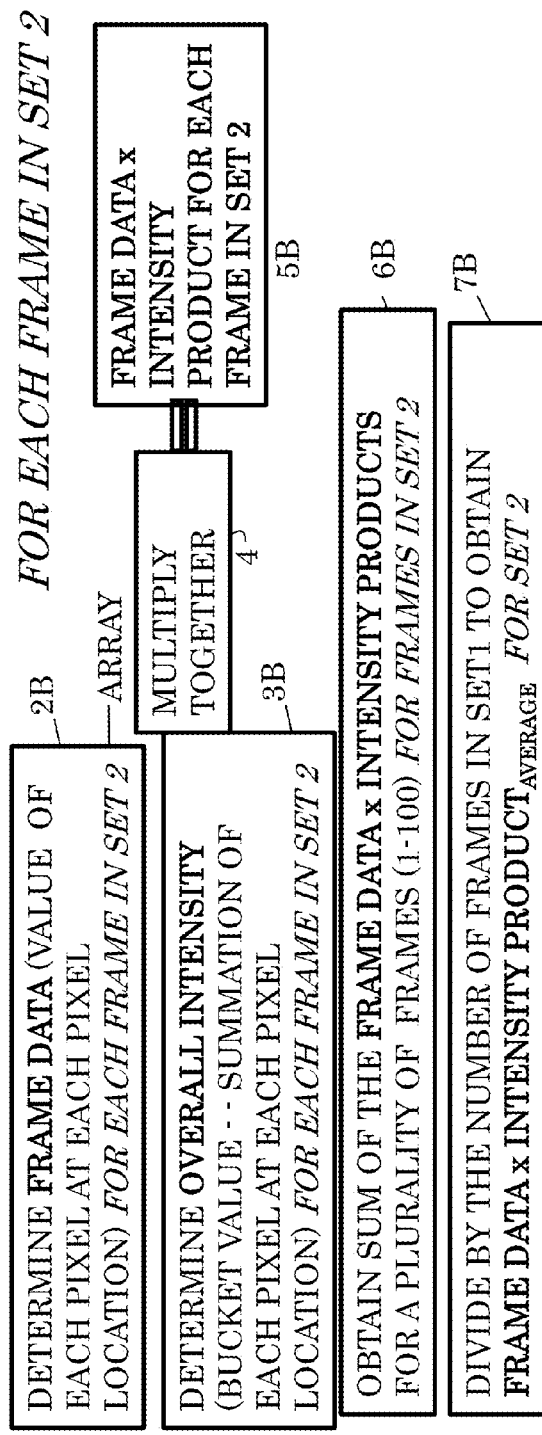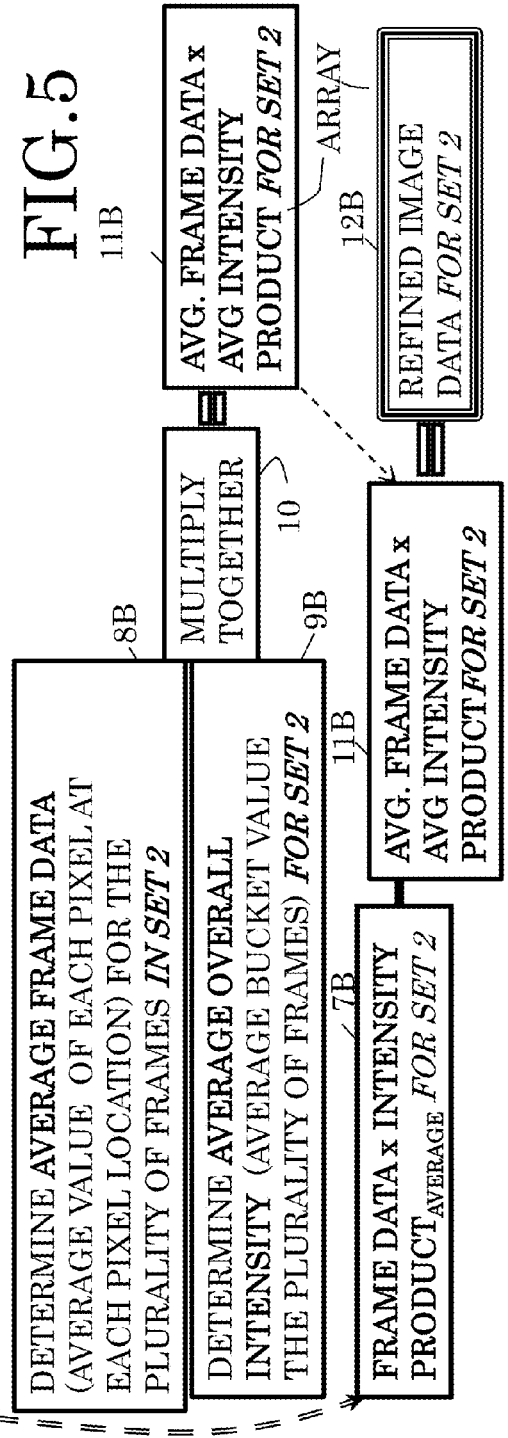
FIG. 5

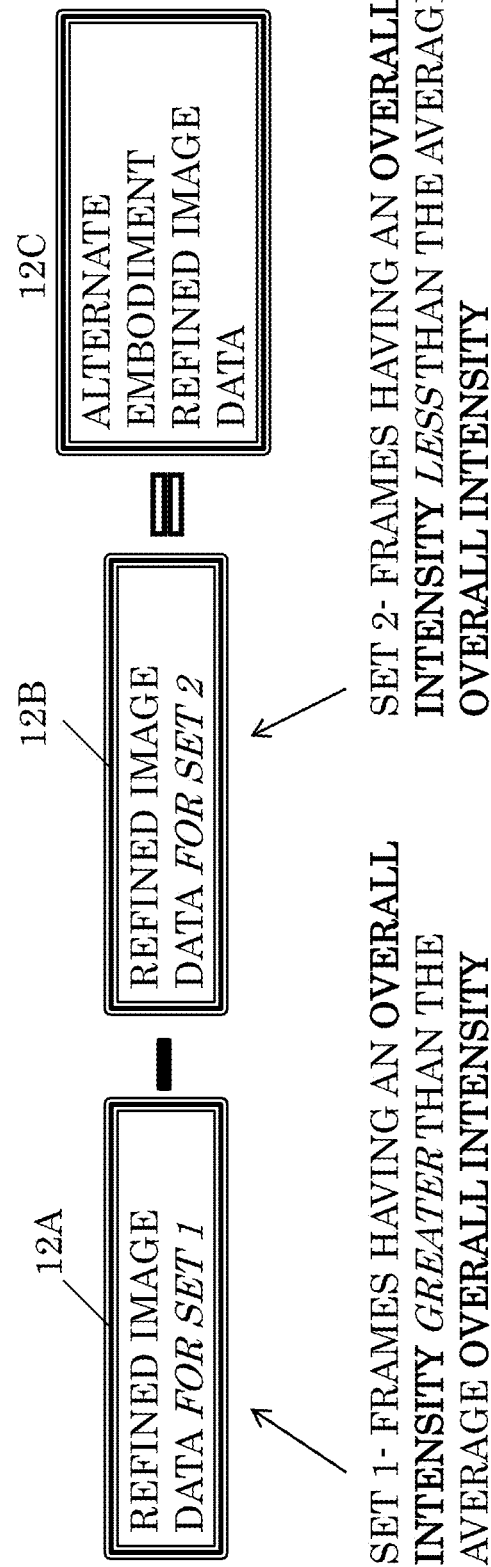

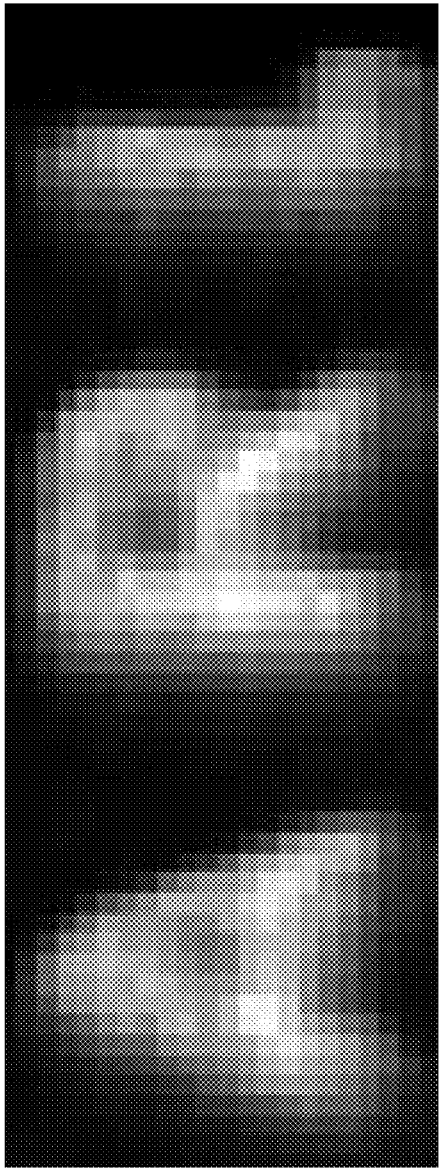
FIG. 7 Self Bucket $G^{(2)}$ Virtual Ghost Image with turbulence 10k Frames.
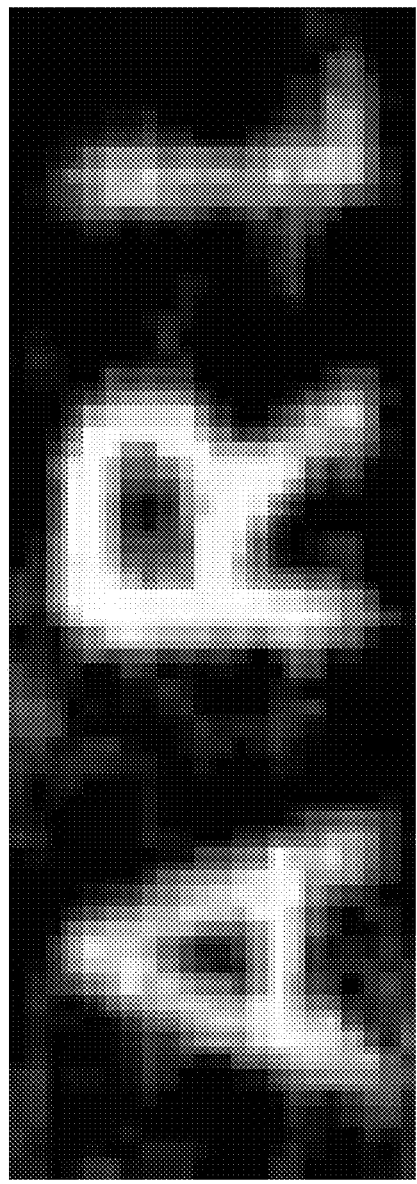
FIG. 8 $G^{(2)}$ Ghost image computed using the 2 path configuration.

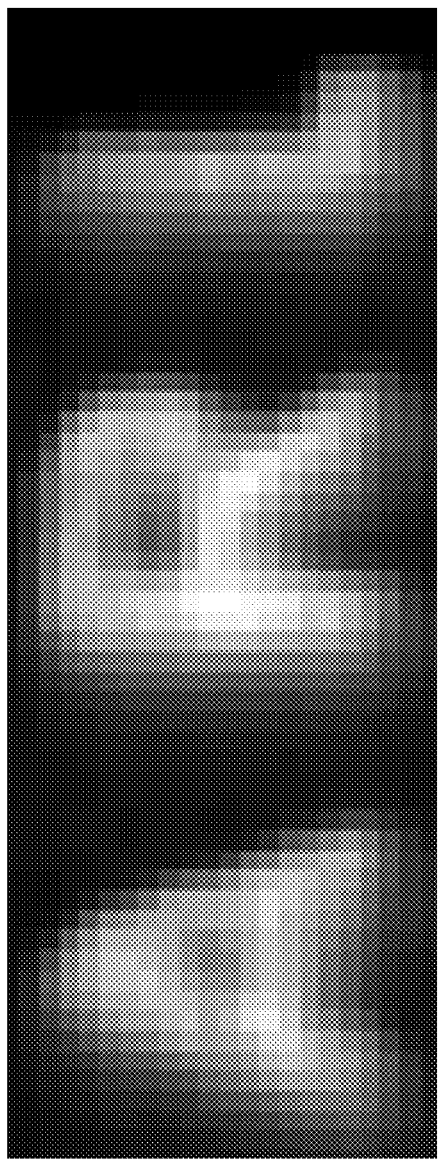
FIG.9 Mean Bucket/Target Image 10k Frames.
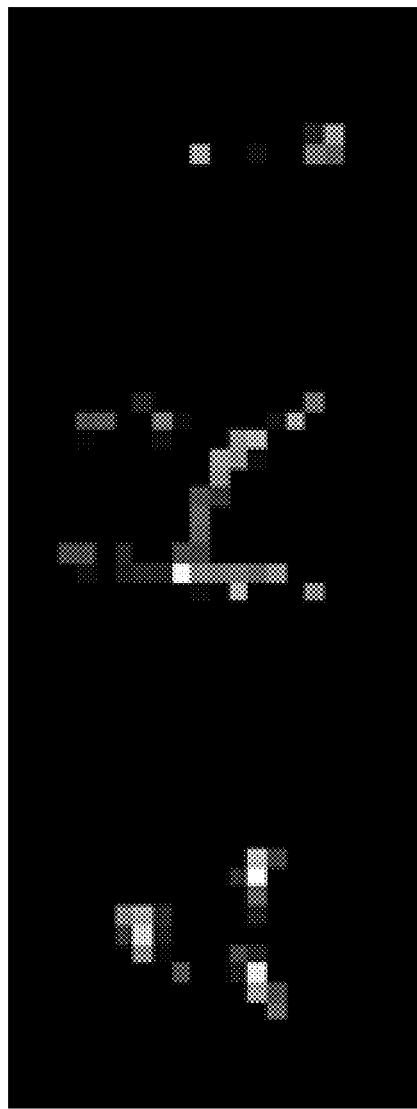
FIG.10 Self Bucket G(2) GPSR with turbulence 10k Frames; Data normalized globally 0-1; $\tau$=1e8; Tol=1e-6; Non Zero=67

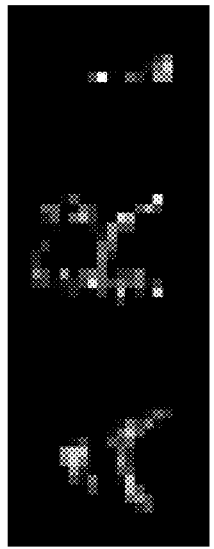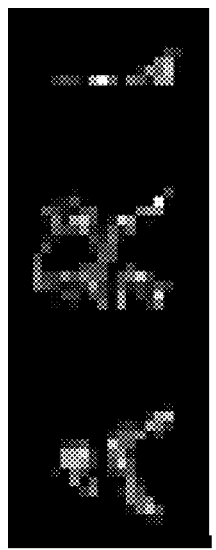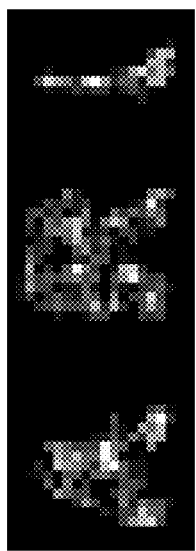
FIG. 11 Self Bucket G(2) GPSR with turbulence 10k Frames; Data normalized globally
0-1; tau=5e7; Tol=1e-6; Non Zero=131
FIG. 12 Self Bucket G(2) GPSR with turbulence 10k Frames;Data normalized globally
0-1; tau=2.5e7; Tol=1e-6; NonZero=183
FIG. 13 Self Bucket G(2) GPSR with turbulence 10k Frames; Data normalized globally
0-1; tau=1e7; Tol=1e-6; Non Zero=304

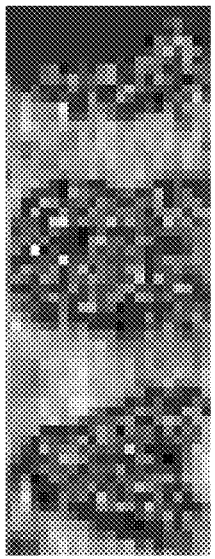
FIG. 14 Self Bucket G$^{(2)}$ GPSR with turbulence 10k Frames; Data normalized globally 0-1; tau =1e6; Tol=1e-6; Non Zero=1310
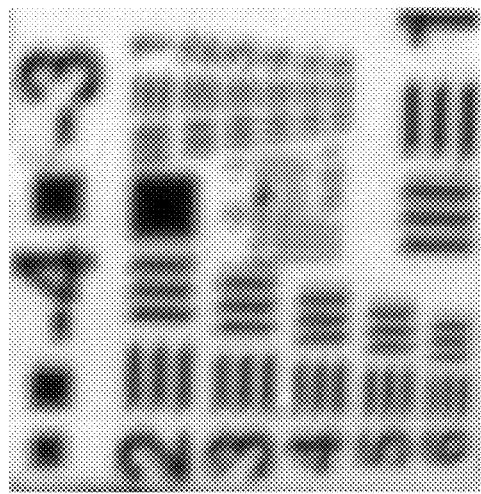
FIG. 15 Sample instantaneous data image. Frame = 137

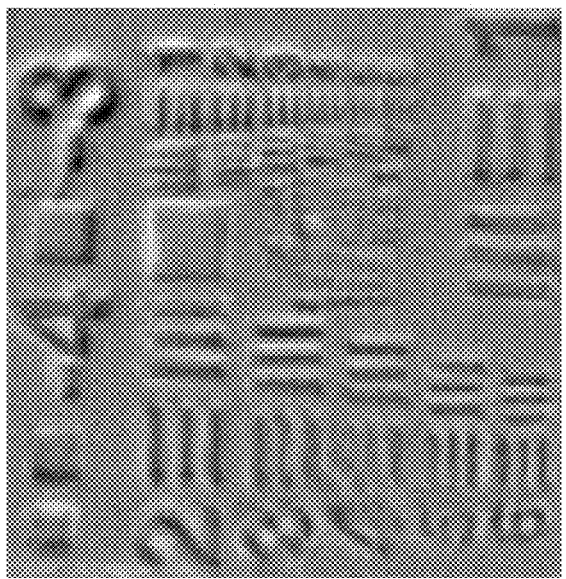
FIG. 17 Frame Self Bucket G(2) frames, 100m distance through turbulence.
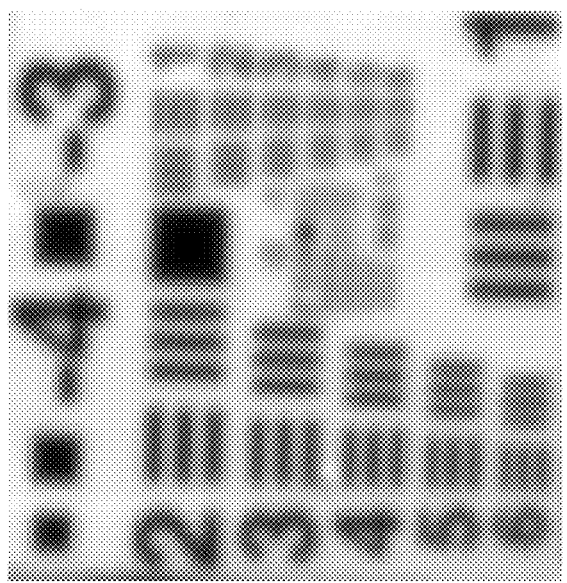
FIG. 16 Average of 335 frames

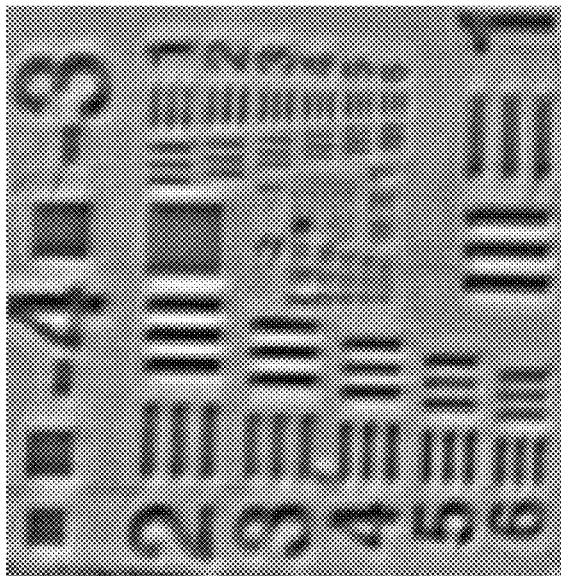
FIG. 18  335 Frame Self Bucket G(2), 100m distance through turbulence.

SYSTEM AND METHOD FOR IMAGE ENHANCEMENT

GOVERNMENT INTEREST

The invention described herein may be manufactured, used, and/or licensed by or for the United States Government.

FIELD OF THE INVENTION

This invention relates in general to a method of image processing, and more specifically relates to image enhancement.

BACKGROUND OF THE INVENTION

Image processing is a form of signal processing for which the input is an image, such as a photograph or video frame, and the output is either image or a set of characteristics or parameters related to the image. Forms of image processing include face detection, feature detection, medical image processing, computer vision (extraction of information from an image by a computer), microscope image processing, etc.

Image resolution relates to the detail that an image possesses. For satellite images, the resolution generally correlates to the area represented by each pixel. Generally speaking, an image is considered to be more accurate and detailed as the area represented by each pixel is decreased. As used herein, the term images include digital images, film images, and/or other types of images. Cameras taking pictures from great distances, such as aerial photos, may not obtain detailed information about the subject matter. Consequently, subtle or detail information are not present in the images.

When an image is captured by a monochrome camera, a single charge-coupled device (CCD) or complementary metal-oxide semiconductor (CMOS) sensor is used to form an image via the light intensity projected onto the sensor.

In U.S. Pat. No. 7,536,012, to Meyers et al., entitled "Entangled Quantum Communications and Quantum Imaging," there is disclosed, inter alia, a Quantum Imaging System (see Col. 8, line 50, et seq.) in which the sender sends an image of an image mask using entangled photons and coincidence measurements to a receiver. The system differs from the conventional quantum imaging set-up in that polarization beam splitters are placed in the path of the photons to provide two channels for each of the sender and the receiver, as shown in FIG. 4 of the '012 patent. On the sender's side, a photon beam is split by a beam splitter into first and second sub-beams. The first sub-beam is passed through a mask 164 which creates the image which is directed through a beam splitter 166 to bucket detectors 168, 170, which are operatively connected to a coincidence circuit. The second sub-beam is transmitted to the receiver without ever passing through the mask 164. In the embodiment of FIG. 4 of the '012 Patent, the receiver receives the second sub-beam and an image of the mask is constructed based upon photon coincident measurements composited from two photon detectors 168 and 170, also referred to a bucket detectors. The image of a mask is transmitted via coincidences and the photons transmitting the image have never encountered the image mask. Because of the somewhat puzzling nature or circumstances of the transmission, the process has been dubbed by some as "Ghost Imaging," while others have explained the effects as resulting from the quantum properties of light.

SUMMARY OF THE INVENTION

The present invention provides a method and system for the enhancement of images using the quantum properties of light.

An embodiment of the present invention increases the image quality of an object or scene as seen by a detector. When a low quality detector is aimed at an object, a high quality image is generated using the quantum properties of light. A low quality detector picks up quantum information on the object shape and its temporal relations to reference fields. The reference fields may be recorded by the same imager (CCD, camera, etc.) that acts as a bucket detector (that is, it does not necessarily contain spatial information).

Current imaging methods are limited to the quality of the detector looking at the object being imaged. A preferred embodiment generates an improved quality image of the object without the object being imaged in high resolution directly. The preferred method may be used in connection with photographs taken during turbulent conditions.

A preferred embodiment comprises at least one processor, at least one memory operatively associated with the at least one processor, the at least one processor operating to perform the following steps not necessarily in the order recited:

(a) providing a series of frames of a given region of interest;

(b) determining the value of each pixel at each location within each frame to form a first array of pixel values for each frame;

(c) determining the overall intensity of each frame;

(d) determining the product of the overall intensity and the array of pixel values for each frame;

(e) determining the sum of the products by adding together the products of the overall frame intensity and first array of pixel values for each frame;

(f) determining the average of the sum of products by dividing the sum of products by the number of frames in the series of frames;

(g) determining the average value of each pixel at each pixel location for the series of frames to form a second array of average pixel values;

(h) determining the average overall frame intensity for the series of frames;

(i) determining a second product of the second array of average pixel values and the average overall frame intensity;

(j) subtracting the second product from the first product to provide an improved image of the region of interest.

An alternate embodiment comprises computing the average overall intensity of a plurality of frames and arranging the frames into two sets. A first set contains the frames having frame intensities greater than the average overall intensity for all frames; the average overall intensity being the summation of the intensities for frames divided by the number of frames. The second set containing frames having an overall intensity less than the average overall intensity. Each of the first and second sets is processed by repeating steps (a) through (i). The result obtained using the second set of frames is then subtracted from the result obtained using the first set of frames to create the image.

BRIEF DESCRIPTION OF THE DRAWINGS

The present invention can best be understood when reading the following specification with reference to the accompanying drawings, which are incorporated in and form a part of the specification, illustrate alternate embodiments of the present invention, and together with the description, serve to explain the principles of the invention. In the drawings.

Figure 1:
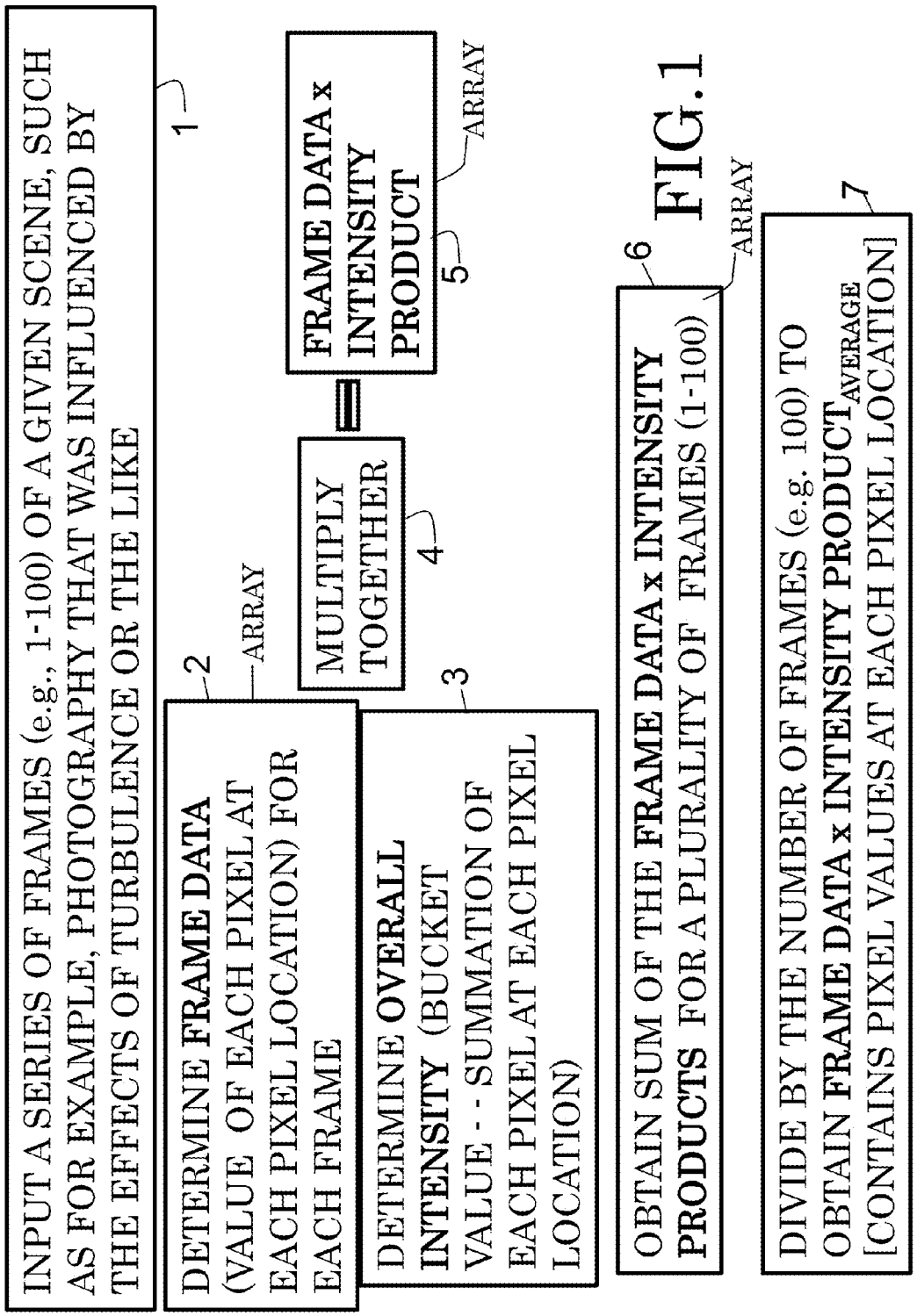
FIG. 1 is a partial schematic block diagram illustration of the steps for performing a preferred method of the present invention.
Figure 2:
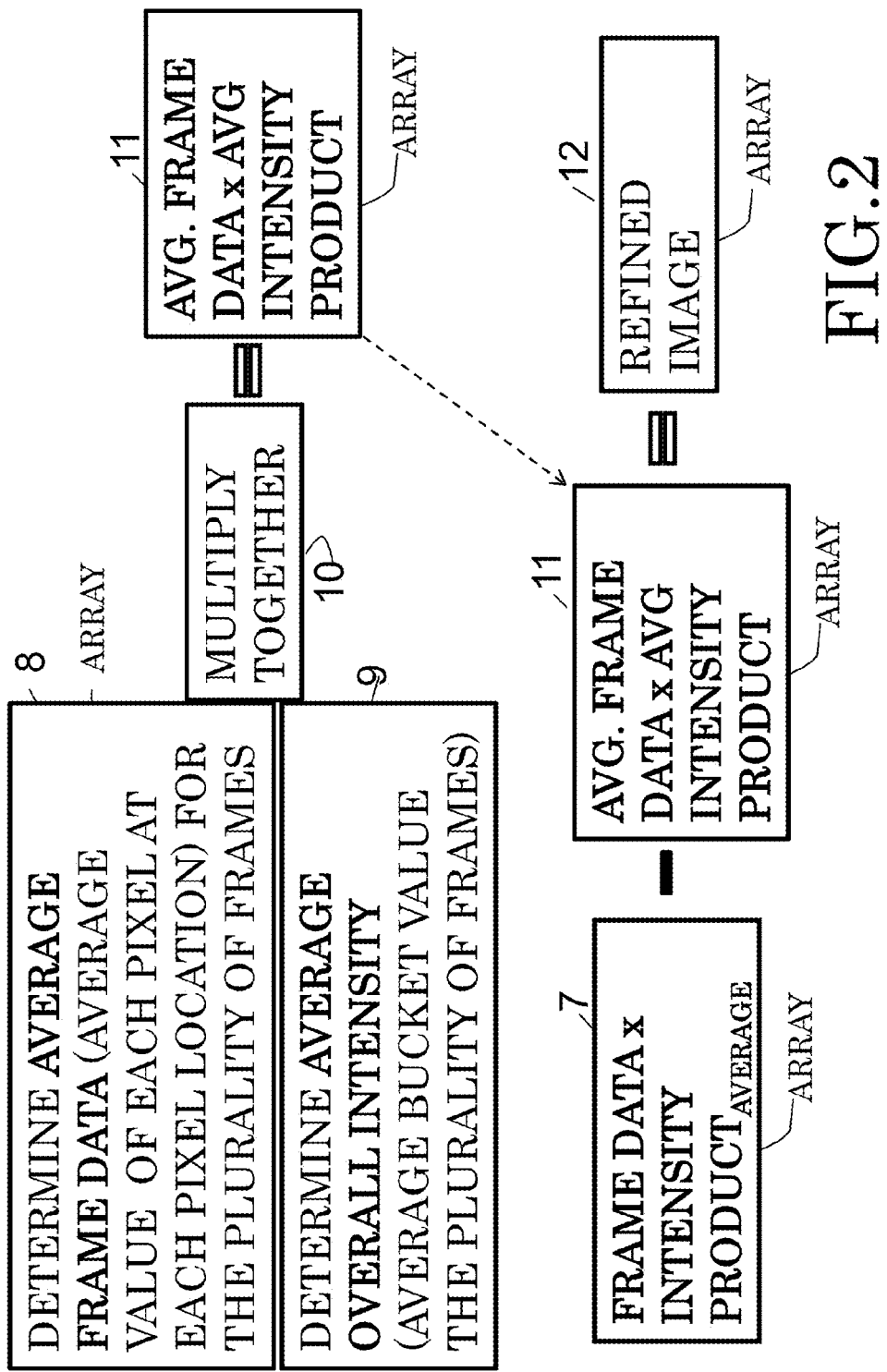
FIG. 2 is a schematic block diagram illustration of the steps for performing a preferred method of the present invention.

Taken together, FIGS. 1 and 2 outline the steps of a preferred methodology for the present invention.

FIG. 3 is a partial schematic block diagram illustration of the steps for performing an alternate preferred method of the present invention in which steps for dividing the frames into two sets are illustrated.

Figure 4:
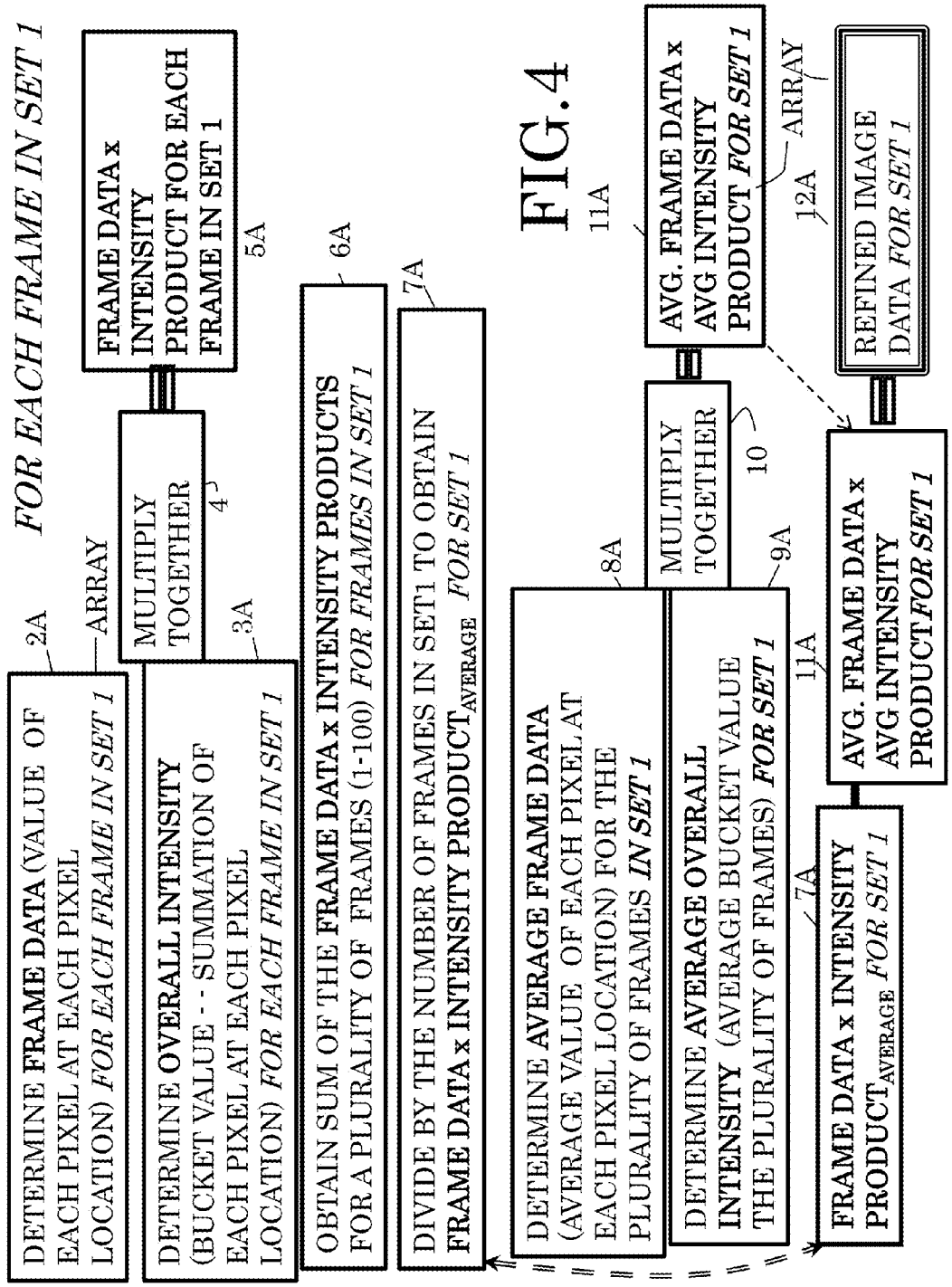

FIG. 4 is a partial schematic block diagram illustration of the steps for performing an alternate preferred method of the present invention in which steps performed on the first set of frames are illustrated.

FIG. 5 is a partial schematic block diagram illustration of the steps for performing an alternate preferred method of the present invention in which steps performed on the second set of frames are illustrated.

FIG. 6 is a partial schematic block diagram illustration of the steps for performing an alternate preferred method of the present invention in which the refined image data for the second set is subtracted from the refined image data for the first set.

FIG. 7 is an illustration a $G^{(2)}$ Virtual Ghost Image with turbulence using 10k frames.

FIG. 8 is an illustration of a $G^{(2)}$ Ghost image computed using the 2 path configuration.

FIG. 9 is an illustration of the "Mean Bucket/Target Image" using 10k frames.

FIG. 10 is an illustration of a "Self Bucket G(2) GPSR with turbulence" using 10k Frames; data normalized globally 0-1; $\tau=1\times10^8$; Tol=$1\times10^{-6}$; Non Zero=67 (number of pixels not zero).

FIG. 11 is an illustration of a "Self Bucket G(2) GPSR" with turbulence 10k Frames; Data normalized globally 0-1; $\tau=5\times10^7$; Tol=$1\times10^{-6}$; Non Zero=131.

FIG. 12 is an illustration of a "Self Bucket G(2) GPSR" with turbulence 10k Frames; Data normalized globally 0-1; $\tau=2.5\times10^7$; Tol=$1\times10^{-6}$; NonZero=183.

FIG. 13 is an illustration of a "Self Bucket G(2) GPSR" with turbulence 10k Frames; Data normalized globally 0-1; $\tau=1\times10^7$; Tol=$1\times10^{-6}$; Non Zero=304.

FIG. 14 is an illustration of a "Self Bucket $G^{(2)}$ GPSR" with turbulence 10k Frames; Data normalized globally 0-1; $\tau=1\times10^6$; Tol=$1\times10^{-6}$; Non Zero=1310.

FIG. 15 is an illustration of a sample instantaneous data image.

FIG. 16 is an illustration of an average of 335 frames.

FIG. 17 is an illustration of an image formed utilizing the Ghost imaging concept using 2 frames taken at a distance of 100 m through turbulence.

FIG. 18 is an illustration of an image formed using 335 frames; "Self Bucket G(2), 100 m distance through turbulence.

Figure 19:
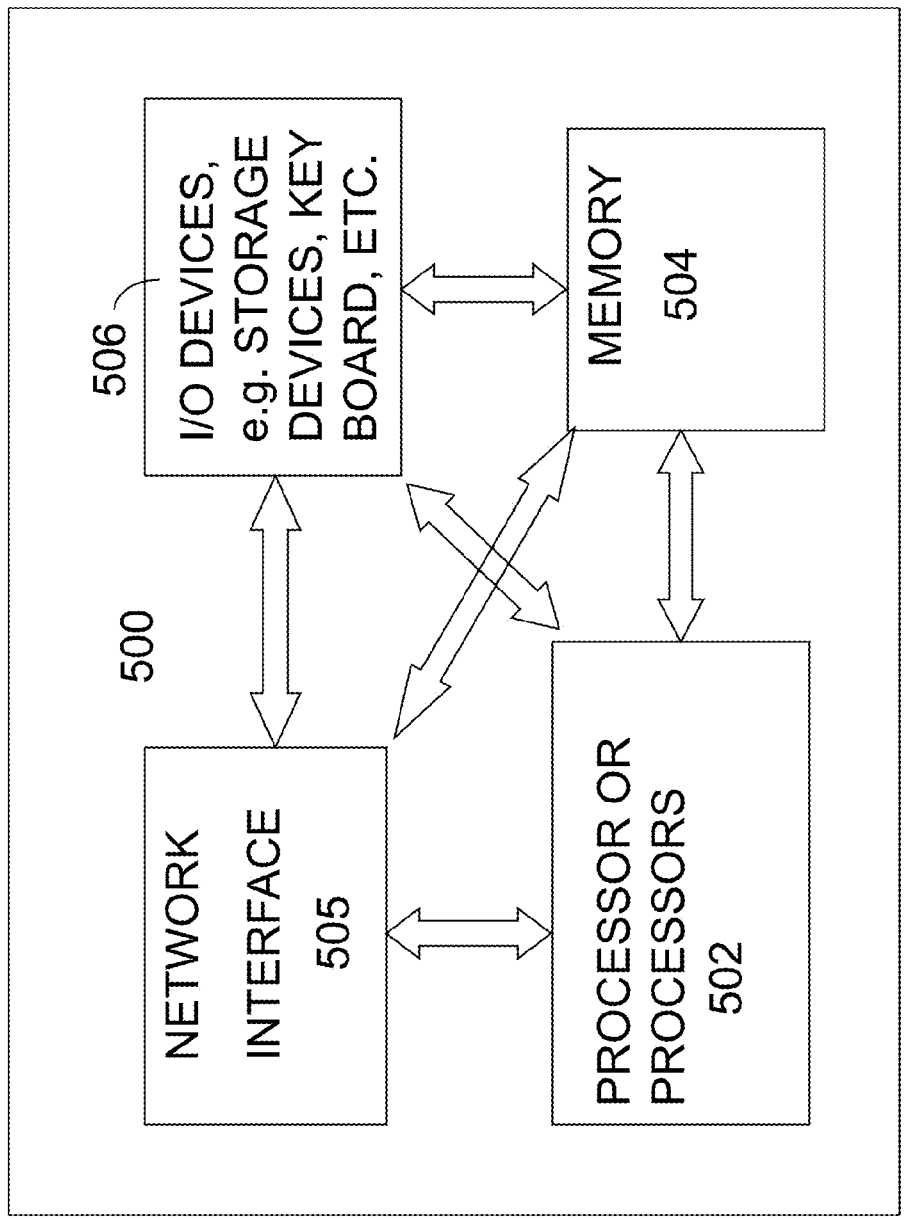

FIG. 19 depicts a high level block diagram of a general purpose computer.

DETAILED DESCRIPTION OF THE PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Rather, these embodiments are provided so that this disclosure will be thorough and complete, and will fully convey the scope of the invention to those skilled in the art. Like numbers refer to like elements throughout. As used herein the term "and/or" includes any and all combinations of one or more of the associated listed items.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The current invention utilizes the ability to increase the image quality of an object as seen by a detector using methods relating to the Quantum nature of light. When a low quality detector is aimed at an object, then a high quality image may be generated based on the quantum properties of light. The high quality image is generated even in the presence of turbulence which might otherwise be disruptive to image clarity. Scattering of quantum particles such as photons off the object carries information of the object shape even when the quantum particles such as photons do not go directly into the camera or detector. An additional low quality bucket detector (i.e. detector lacking spatial information) records quantum information on the object shape and its temporal relations to collocated reference fields. The reference fields are recorded by the same type of imager (CCD, Camera, etc.) that looks at the object and which act like bucket detectors in U.S. Pat. No. 7,536,012, hereby incorporated by reference.

Current Imaging methods are limited to the quality of the detector looking at the object being imaged. This invention enables an image quality improvement by using Ghost Imaging Inspired methods to generate a high quality image of the object without the object being imaged in high resolution directly. A preferred embodiment enables high quality imaging when only low quality images of the object are imaged directly.

Referring now to FIG. 1, in accordance with a preferred methodology, in Box 1 a series of frames are inputted into the memory or input of a processor or image processor. As used herein the terminology "processor" or "image processor" as used in the following claims includes a computer, multiprocessor, CPU, minicomputer, microprocessor or any machine similar to a computer or processor which is capable of processing algorithms. The frames may comprise photographs of the same region of interest. The region of interest may be a scene, landscape, an object, a subject, person, or thing. In Box 2, the frame data or value of each pixel at each pixel location is determined for a frame. In Box 3, the overall intensity of the frame is determined. The overall intensity correlates to a "bucket value" determination in that overall intensity value does not comprise spatial information. Instead, it correlates to the summation of the light intensity of a frame. In the case of a picture, the overall intensity correlates to the sum of the reflected illumination. In the case of an electronic display formed by pixels, the overall intensity is the summation each pixel value at each pixel location within a given frame. At Box 4, the values in Box 2 are multiplied by the value determined in Box 3. Box 5 represents the Frame Data×Intensity Product for the frame. Inasmuch as the Frame Data is an array of pixel values, the Frame Data×Intensity Product is also an array of values. At Box 6, the products of Box 5 (Frame Data×Intensity Product) are repeated for each frame in a selected plurality of frames. As an example, one hundred frames may be selected. At Box 7, the summation of the Frame Data×Intensity Products for the plurality of frames determined in Box 6 is divided by the number of frames (such as for example one hundred) to determine the Frame Data×Intensity Product Average for the plurality of frames. As noted in Box 7, this Product Average is an array containing pixel values at each pixel location within the frame.

FIG. 2 is a further description of a preferred methodology of the present invention. Note that Box 7 is carried over from FIG. 1 into FIG. 2. In Box 8, the average frame data (or average value of each pixel at each pixel location) is determined for the plurality of frames (e.g. 100) by averaging the pixel values at each pixel location for the plurality of frames to determine an array of average pixel values. In Box 9, the average overall intensity for the plurality of frames is determined. The is similar to the determination of Box 3 except that Box 3 is a determination for a frame and Box 9 is an average for a plurality of frames. As stated with respect to Box 3, the overall frame intensity correlates to a "bucket value" determination in that overall intensity value does not comprise spatial information. Instead, it correlates to the summation of the light intensity of a frame. In the case of a picture, the overall frame intensity correlates to the sum of the reflected illumination. In the case of an electronic display formed by pixels, the overall intensity is the summation each pixel value at each pixel location within a given frame. The average overall intensity is the summation of the values for a plurality of frames divided by the number of frames.

Box 10 represents the multiplication of Boxes 8 and 9 to form the Average Frame Data×Average Intensity Product, which is an array. As shown in the bottom portion of FIG. 2, the Average Frame Data×Average Intensity Product is subtracted from the Frame Data×Intensity Product Average to form the refined image of Box 12.

It is postulated that the preferred methodology in effect subtracts out or negates the effects or errors due to the effects of turbulence or the like. Most fluctuations caused by turbulence occur at the "edges" of objects. The algorithm focuses on the edges of letters, objects, etc. to refine the image edges.

FIG. 3 is a partial schematic block diagram illustration of the steps for performing an alternate preferred method of the present invention in which steps for dividing the frames into two sets are illustrated. In Box 1 a series of frames are inputted into the memory or input of a processor or image processor. The frames may comprise photographs of the same region of interest. The region of interest may be a scene, landscape, an object, a subject, person, or thing. In Box 3, the overall intensity of the frame is determined. The overall intensity correlates to a "bucket value" determination in that overall intensity value does not comprise spatial information. Instead, it correlates to the summation of the light intensity of a frame. In the case of a picture, the overall intensity correlates to the sum of the reflected illumination. In the case of an electronic display formed by pixels, the overall intensity is the summation each pixel value at each pixel location within a given frame. In Box 13, the average overall intensity for all frames in the inputted (see Box1) is computed. To determine the average overall intensity, the summation of the intensities for frames is divided by the number of frames. In Box 14, the frames are separated into two sets; set one contains frames having an overall intensity greater than the average overall intensity (derived in Box 13) and set two contains frames having an overall intensity less than the average overall intensity (derived in Box 13)

FIG. 4 is a partial schematic block diagram illustration in which steps performed on the first set of frames are illustrated. The steps are comparable in effect to the similarly numbered frames in FIGS. 1 and 2, as denoted by the addition of a letter "A" suffix to the correlating element number. In Box 2A, the frame data or value of each pixel at each pixel location is determined for a frame. In Box 3A, the overall intensity ("bucket value") of the frame is determined. In the case of a picture, the overall intensity correlates to the sum of the reflected illumination. In the case of an electronic display formed by pixels, the overall intensity is the summation each pixel value at each pixel location within a given frame. At Box 4, the values in Box 2A are multiplied by the value determined in Box 3A. Box 5A represents the Frame Data×Intensity Product for the frame. Inasmuch as the Frame Data is an array of pixel values, the Frame Data×Intensity Product is also an array of values. At Box 6A, the products of Box 5A (Frame Data×Intensity Product) are repeated for each frame in the first set of frames. At Box 7A, the summation of the Frame Data×Intensity Products for the plurality of frames determined in Box 6A is divided by the number of frames (such as for example one hundred) to determine the Frame Data×Intensity Product Average for the first set of frames. As noted in Box 7A, this Product Average is an array containing pixel values at each pixel location within the frame.

In the lower portion of FIG. 4, note that Box 7A is repeated as shown by the arrow. In Box 8A, the average frame data (or average value of each pixel at each pixel location) is determined for the first set of frames by averaging the pixel values at each pixel location for the first set of frames to determine an array of average pixel values for the first set. In Box 9A, the average overall intensity for the first set of frames is determined. This is similar to the determination of Box 3A except that Box 3A is a determination for a frame and Box 9A is an average for a plurality of frames. As stated with respect to Box 3A, the overall frame intensity correlates to a "bucket value" determination in that overall intensity value does not comprise spatial information. Instead, it correlates to the summation of the light intensity of a frame. In the case of a picture, the overall frame intensity correlates to the sum of the reflected illumination. In the case of an electronic display formed by pixels, the overall intensity is the summation each pixel value at each pixel location within a given frame. The average overall intensity is the summation of the values for a plurality of frames divided by the number of frames.

Box 10 represents the multiplication of Boxes 8A and 9A to form the Average Frame Data×Average Intensity Product, which is an array. As shown in the bottom portion of FIG. 4, the Average Frame Data×Average Intensity Product is subtracted from the Frame Data×Intensity Product Average to form the refined image of Box 12A.

FIG. 5 is a partial schematic block diagram illustration of the steps for performing an alternate preferred method of the present invention in which steps performed on the second set of frames are illustrated. The steps are comparable in effect to the similarly numbered frames in FIGS. 1, 2, and 4 as denoted by the addition of a letter "B" suffix to the correlating element number. In Box 2B, the frame data or value of each pixel at each pixel location is determined for a frame. In Box 3B, the overall intensity ("bucket value") of the frame is determined. In the case of a picture, the overall intensity correlates to the sum of the reflected illumination. In the case of an electronic display formed by pixels, the overall intensity is the summation each pixel value at each pixel location within a given frame. At Box 4, the values in Box 2B are multiplied by the value determined in Box 3B. Box 5B represents the Frame Data×Intensity Product for the frame. Inasmuch as the Frame Data is an array of pixel values, the Frame Data×Intensity Product is also an array of values. At Box 6B, the products of Box 5B (Frame Data×Intensity Product) are repeated for each frame in a second set of frames. At Box 7B, the summation of the Frame Data×Intensity Products for the plurality of frames determined in Box 6B is divided by the number of frames (such as for example one hundred) to determine the Frame Data×Intensity Product Average for the second set of frames. As noted in Box 7B, this Product Average is an array containing pixel values at each pixel location within the frame.

In the lower portion of FIG. 5, note that Box 7B is repeated as shown by the arrow. In Box 8B, the average frame data (or average value of each pixel at each pixel location) is determined for the first set of frames by averaging the pixel values at each pixel location for the first set of frames to determine an array of average pixel values for the first set. In Box 9B, the average overall intensity for the second set of frames is determined. This is similar to the determination of Box 3B except that Box 3B is a determination for a frame and Box 9B is an average for a plurality of frames. As stated with respect to Box 3B, the overall frame intensity correlates to a "bucket value" determination in that overall intensity value does not comprise spatial information. Instead, it correlates to the summation of the light intensity of a frame. In the case of a picture, the overall frame intensity correlates to the sum of the reflected illumination. In the case of an electronic display formed by pixels, the overall intensity is the summation each pixel value at each pixel location within a given frame. The average overall intensity is the summation of the values for a plurality of frames divided by the number of frames.

Box 10 represents the multiplication of Boxes 8B and 9B to form the Average Frame Data×Average Intensity Product, which is an array. As shown in the bottom portion of FIG. 5, the Average Frame Data×Average Intensity Product is subtracted from the Frame Data×Intensity Product Average to form the refined image of Box 12B.

FIG. 6 is a partial schematic block diagram illustration of the steps for performing an alternate preferred method of the present invention in which the refined image data for the second set is subtracted from the refined image data for the first set to form enhanced image data (Box 12C).

Another alternate preferred method of the present invention applies the use of techniques from the field of Compressive Imaging or Compressive Sensing. In this embodiment the "bucket" values for each frame of the series is computed by integrating the values of the pixels within each frame. This bucket data is stored for use per Eq. 5 below. The pixel values for each frame of the series are stored as a row in a matrix J. The improved image is computed by application of a Compressive Imaging inversion algorithm such as GPSR to solve Eq. 6. The improved image is returned in the matrix R.

Virtual Ghost Imaging

Virtual Ghost Imaging refers to an imaging process which creates an enhanced image from a series of frames of an imaging subject based on a process related to Ghost Imaging.

Virtual Ghost Imaging in the current instance applies the following process to a series of frames of an imaging subject.

Inasmuch as the overall frame intensity value determined in Box 3 correlates to the "bucket" value, a brief discussion of ghost imaging and reflective ghost imaging follows. Typically ghost imaging uses two detectors, one to observe the light source and the other, single pixel or bucket detector, to observe the light scattering and reflecting from the target object.

$$G^{(2)} = \langle I(x,y,t)_{source} I(t)_{bucket} \rangle - \langle I(x,y,t)_{source} \rangle \langle I(t)_{bucket} \rangle \quad \text{Equation 1}$$

where $\langle\,\rangle$ denotes an ensemble average. If $I_{source}$ and $I_{bucket}$ are recorded from the same target object, $I_{bucket}$ may be computed as $$I(t) = \zeta \int dx dy I(x,y,t) source \quad \text{Equation 2}$$

Basic Virtual Ghost Imaging

Results of an experiment conducted through turbulence using chaotic laser or pseudo-thermal light are presented in FIG. 7. FIG. 8 shows the same target computed with data taken using a typical two path configuration.

FIG. 5 shows the average of the target images that were captured through turbulence. Note the blurriness and lack of definition of the letters. As one can see the "ARL" in FIG. 7 is a visually better image than that displayed FIG. 9. However, the "true" ghost image displayed in FIG. 8 has better contrast and definition of the letters than FIG. 7 or FIG. 9. This is likely due to the use of a reference field that has not been altered by interaction with a target object.

Accelerated (Compressive Imaging) $G^{(2)}$ Virtual Ghost Imaging

A relatively new mathematical field named Compressive Sensing(CS) or Compressive Imaging(CI) can be used to good effect within the context of ghost imaging. The first use of compressive techniques in the context of Ghost Imaging was performed by the Katz group (see O. Katz, et al., "Compressive Ghost Imaging," Appl Phys. Lett., 95,131110 (2009))(hereby incorporated by reference) who demonstrated a ghost like imaging proposal of Shapiro (see J. Shapiro, "Computational Ghost Imaging," Phys. Rev. A 78 061802(R) (2008)). Their demonstration was limited to a transmission object.

More recently the present inventors have performed experiments of this nature using reflection objects.

The inventors' use of CS and CI is based on finding approximate solutions to the integral equations using the GPSR mathematical methodology where $$JR = B \quad (3)$$

and $$R = R(x,y) \quad (4)$$

is the object reflectance. The term J is a matrix, where the rows are the illumination patterns at time k and the B vector:

$$B = [B_k] \quad (5)$$

represents the bucket values. In cases where the system is underdetermined (too few $[B_k]$), then L1 constraints are applied to complete the system and sparseness is used:

$$\arg\min_R = \frac{1}{2} \|B - JR\|_2^2 + \tau \|R\|_1 \quad (6)$$

The CS computational strategy takes advantage of the fact that it is normally true in images that not all pixels in an image contain new information and the system is said to be sparse on some basis since fewer degrees of freedom are needed to describe the system than the total number of pixels in the image. The parameter $\tau$ is often a constant.

CI results for the ARL target are presented using Eq. 2 and varying the $\tau$ parameter. FIG. 10 is an example of a result where $\tau$ is too large and most of the pixel values are driven to 0. One can sense that the letters "ARL" are in the figure. Decreasing $\tau$ to a value of 5e7, shown in FIG. 11 more portions of the "ARL" letters appear. When $\tau$ is set to 2.5e7 the R is quite clear in FIG. 12 but the appearance of the A and the L are still degraded. Continuing with the examination of the effect of the parameter $\tau$, the value of $\tau$ is set to 1e7. These results are shown in FIG. 13.

Finally, as a lower image quality bound, $\tau$ is set to equal 1e6. The "ARL" presented in FIG. 14 is quite degraded. These GPSR calculated Virtual Ghost imaging results highlight the sensitivity of the calculations to an external parameter ($\tau$) which has no connection to the underlying physics.

Air Force Resolution Target

Results were computed using Eq. 1 subject to the self-bucketing concept of Eq. 2. These results are generated from a few hundred shots of the Air Force resolution target imaged at a 100 m distance through turbulence.

A single image from this data set is presented in FIG. 15. This image illustrates the distorting effect of turbulence on imaging. A simple averaging of 335 frames of the dataset was performed as shown in FIG. 16. This average image has some better qualities that the single frame image of FIG. 15 but one can still only resolve the coarser scale features of the Air Force target.

Using the self-bucket ghost imaging concept on this dataset, an initial result using only 2 frames of the dataset is displayed in FIG. 17. Some of the edges in this image are very distinct and superior to areas in either the instantaneous or the average images. When the entire dataset is used, as presented in FIG. 18, the results are striking. In particular the 4 and 5 on the right side of the target are legible and the small horizontal and vertical bars to the left of the numbers are distinct; whereas those regions in the instantaneous and average images are simply blurs.

FIG. 19 depicts a high level block diagram of a general purpose computer suitable for use in performing the functions described herein, including the steps shown in the block diagrams, schematic representations, and/or flowcharts. As depicted in FIG. 19, the system 500 includes a processor element 502 (e.g., a CPU) for controlling the overall function of the system 500. Processor 502 operates in accordance with stored computer program code, which is stored in memory 504. Memory 504 represents any type of computer readable medium and may include, for example, RAM, ROM, optical disk, magnetic disk, or a combination of these media. The processor 502 executes the computer program code in memory 504 in order to control the functioning of the system 500. Processor 502 is also connected to network interface 505, which transmits and receives network data packets. Also included are various input/output devices 506 (e.g., storage devices, including but not limited to, a tape drive, a floppy drive, a hard disk drive or compact disk drive, a receiver, a transmitter, a speaker, a display, a speech synthesizer, an output port, and a user input device (such as a keyboard, a keypad, a mouse and the like).

Potential Applications

The potential extent of possible use of this invention is described in the following. However, this description should not be construed as limited to the statements. Potential applications include high resolution imaging, remote sensing, microscopic sensing, spectroscopy, identification of hidden or concealed objects, remote biometrics, design of new sensors and image processing methods, design of new types of stealth technology, design of new types of communications devices.

Speed Traffic Enforcement

Current local governments use traffic enforcement cameras to enforce traffic regulation violations. A traffic enforcement camera (also road safety camera, road rule camera, photo radar, speed camera, Gatso™) is an automated ticketing machine. It may include a camera which may be mounted besides, on, or over a highway or installed in an enforcement vehicle to detect traffic regulation violations, including speeding, vehicles going through a red traffic light, unauthorized use of a bus lane, for recording vehicles inside a congestion charge area and others. The latest automatic number plate recognition (ANPR) systems can be used for the detection of average speeds and use optical character recognition on images to read the license plates on vehicles. There are a number of possible factors that affect the ANPR software performance. One of these important factors is poor image resolution, usually because the plate is too far away but sometimes resulting from the use of a low-quality camera. In the case of camera recording a video (a sequence of images), this invention can process the recorded images to improve image quality of the license plate on vehicle. The enhanced license plate images are used to improve the performance of ANPR software. The invention is especially useful when the images are acquired from a far away distance and/or from a low-quality camera.

The invention may be utilized in conjunction with large crowd event security and management. Events involving a large crowd, especially the types of events including circuses, sporting events, theatrical events, concerts, rallies, parades, etc., the security task is to prevent, where possible, crimes including theft, vandalism or assault through the deployment of trained and licensed security personnel. Camera monitoring is an important component in this type of event security and management. The invention can be used to improve image details of a human face, nomenclature on a jersey, or a moving object/vehicle, etc., from a distance, or from the periphery of the event location. Also at football games, a preferred embodiment could be used to enhance the readability of numbers and/or names on football uniforms.

As used herein, the terminology "subject" means: an area, a scene, an object or objects, a landscape, overhead view of land or an object or objects, or a combination thereof.

As used herein, the terminology "frame" means: a picture, an image or one of the successive pictures on a strip of film or video.

As used herein, the terminology "process" means an algorithm, software, subroutine, computer program, or methodology.

As used herein, the terminology "algorithm" means: sequence of steps using computer software, process, software, subroutine, computer program, or methodology.

As used herein, the terminology "image sensor" means: a camera, charge coupled device (CCD), video device, spatial sensor, or range sensor. The image sensor may comprise a device having a shutter controlled aperture that, when opened, admits light enabling an object to be focused, usually by means of a lens, onto a surface, thereby producing a photographic image OR a device in which the picture is formed before it is changed into electric impulses.

The terminology "processor" or "image processor" as used in the following claims includes a computer, multiprocessor, CPU, minicomputer, microprocessor or any machine similar to a computer or processor which is capable of processing algorithms.

The terminology "operations" as used in the following claims includes steps, a series of operations, actions, processes, subprocesses, acts, functions, and/or subroutines.

As used herein the terminology "succession" means the act or process of following in order or sequence, but is not limited to sequential order. As used herein the terminology "succession" refers to a later taken image being compared with an earlier taken image.

As used herein the terminology "array" refers to a systematic arrangement of data in rows and columns. An example of an array is a matrix which is a rectangular array of numbers, symbols, or expressions.

Although various preferred embodiments of the present invention have been described herein in detail to provide for complete and clear disclosure, it will be appreciated by those skilled in the art, that variations may be made thereto without departing from the spirit of the invention.

It should be emphasized that the above-described embodiments are merely possible examples of implementations. Many variations and modifications may be made to the above-described embodiments. All such modifications and variations are intended to be included herein within the scope of the disclosure and protected by the following claims. The invention has been described in detail with particular reference to certain preferred embodiments thereof, but it will be understood that variations and modifications can be effected within the spirit and scope of the invention.

What is claimed is:

1. A processor implemented method for image improvement comprising the following steps not necessarily in sequential order:
   providing a series of frames of a given region of interest;
   determining the value of each pixel at each location within each frame to form a pixel value array for each frame;
   summing the pixel values in each frame to obtain the frame intensity for each frame;
   multiplying the pixels in the pixel value array by the frame intensity to produce a frame intensity multiplied pixel value array;
   summing the frame intensity multiplied pixel value arrays together and dividing by the number of frames to obtain an average of the frame intensity multiplied pixel value arrays;
   using the pixel value arrays, creating an array of average pixel values;
   determining the average frame intensity for the series of frames;
   multiplying the array of average pixel values by the average frame intensity for all of the inputted frames; and
   subtracting the array of average pixel values multiplied by average frame intensity from the average of the frame intensity multiplied pixel value arrays to provide an array of modified pixel values to form an improved image.

2. The method of claim 1 wherein the frames inputted were influenced by the effects of turbulence or were taken in had or changing weather.

3. The method of claim 1 wherein the step of providing a series of frames of a given region of interest comprises computing the average frame intensity of a plurality of frames and arranging the frames into two sets; the first set containing the frames having frame intensities greater than the average frame intensity and the second set containing frames having frame intensities less than the average frame intensity; each of the first and second sets being processed by repeating steps set forth in claim 1 to obtain first and second results; the result using the second set of frames is then subtracted from the result obtained using the first set of frames to create a refined image.

4. The method of claim 1 wherein, the step of determining the frame intensity of each frame comprises adding together the values for the pixels in each frame using a digital camera.

5. The method of claim 1 wherein the step of determining the frame intensity of each frame comprises illuminating a picture and determining the amount of light reflected from the picture by detecting the reflected illumination using at least one detector.

6. The method of claim 5 wherein the at least one detector is one of a camera, bucket detector or charge coupled device.

7. A system for image improvement comprising
   at least one processor,
   at least one memory operatively associated with the at least one processor for storing frames of data taken of a region of interest, each frame of data comprising an array of pixels, each pixel having a pixel value, each frame having a frame intensity correlating to the sum of the pixel values for each frame;
   the at least one processor multiplying the arrays of pixel values for each frame in the series of frames by the frame intensity of each frame to form first product arrays;
   the at least one processor operating to sum together the first product arrays for each frame and determine an averaged first product array by dividing the sum of the first product arrays by the number of frames;
   the at least one processor operating to determine an average frame intensity for the series of frames and an average pixel value of each pixel location for the series of frames and to determine a second product array from the product of the average frame intensity and the average pixel values for each pixel location;
   the at least one processor operating to determine the pixel values for an improved image of the region of interest by subtracting the values of second product array from values of the averaged first product array.

8. The system of claim 7 further comprising at least one input for inputting a series of frames taken of a region of interest and wherein the frames of data are pictures taken of the region of interest during turbulent conditions.

9. The system of claim 7 further comprising a detector operatively associated with the at least one processor operating to determine the light intensity for each frame.

10. The system of claim 7 wherein the frame intensity is determined by summing the values for the pixels in each frame using a digital camera.

11. The system of claim 7 wherein the frames of data taken of a region of interest comprise sparse image data and wherein an image is reconstructed using sparse data from a plurality of image frames.

12. The system of claim 7 wherein the frames of data taken of a region of interest comprise scanned images and wherein the frame intensity of each image is determined by illuminating the scanned image and determining the amount of light reflected from the image using at least one photodetector.

13. The system of claim 12 wherein the at least one photodetector is one of a camera, bucket detector or charge coupled device.

14. A system for image improvement comprising at least one processor,
   at least one memory operatively associated with the at least one processor, the at least one processor operating to perform the following steps not necessarily in sequential order;

providing a series of frames of a given region of interest; each frame comprising an array of pixel values;

determining the frame intensity of each. frame which is substantially equivalent to the summation of pixel values;

determining the products of each array of pixel values for each frame and the frame intensity to form frame intensity multiplied pixel value arrays;

determining the sum of the frame intensity multiplied pixel value arrays for the series of frames;

determining the average of the frame intensity multiplied pixel value arrays by dividing the sum of frame intensity multiplied pixel value arrays by the number of frames in the series of frames;

determining the average value of each pixel at each pixel location for the series of frames to form an array of average pixel values;

determining the average overall frame intensity for the series of frames;

determining the product of the array of average pixel values and the average overall frame intensity;

subtracting the product of the array of average pixel values and the average overall frame intensity from the average of the frame intensity multiplied pixel value arrays to provide refined image data;

forming an image using the refined image data.

15. The system of claim 14 wherein the series of frames comprise a video sequence of images taken in real time.

16. The system of claim 14 wherein the frames of data comprise scanned images and wherein the frame intensity of each image is determined by illuminating the scanned image and determining the amount of light reflected from the image using at least one photodetector.

17. The system of claim 16 wherein the at least one photodetector is one of a camera, bucket detector or charge coupled device.

18. The system of claim 1(wherein the series of frames of a given region of interest comprises frames of data wherein the image of the region of interest has been distorted by the effects of turbulence or weather such that each frame contains one or more distorted features, the system operating to reduce or eliminate the distortion in the images to create an image having greater clarity.

19. The system of claim 18 wherein the distortion is reduced by using the overall intensity of the pixel values to utilize the effects of the quantum properties of light.

20. The system of claim 14 wherein the at least one processor operates to:

determine the average overall frame intensity for the series of frames;

group the frames that have an overall intensity greater than the average overall frame intensity in a first set of frames:

group the frames that have an overall intensity less than the average overall frame intensity into a second set of frames; and for each of the first and second sets of frames:

determine the value of each pixel at each location within each frame to form a first array of pixel values for each frame;

determine the overall intensity of each frame;

determine the products of the each array of pixel values for each frame and the frame intensity to form frame intensity multiplied pixel value arrays;

determine the sum of the frame intensity multiplied pixel value arrays for the series of frames;

determine the average of the frame intensity multiplied pixel value arrays sum of products by dividing the sum of products frame intensity multiplied pixel value arrays by the number of frames in the series of frames;

determine the average value of each pixel at each pixel location for the series of frames to form an array of average pixel values;

determine the average overall frame intensity for the series of frames;

determine the product of the array of average pixel values and the average overall frame intensity;

subtract the product of the array of average pixel values and the average overall frame intensity from the average of the frame intensity multiplied pixel value arrays to provide refined image data for each of the first and second sets of image frames;

form an image by subtracting refined image data obtained using the second set of image frames from the refined image data obtained using the first set of image frames.

* * * * *